US012634770B2

(12) United States Patent
Godin et al.

(10) Patent No.: US 12,634,770 B2
(45) Date of Patent: May 19, 2026

(54) METHODS AND APPARATUS FOR OPTIMIZED INTER-SYSTEM HANDOVER

(71) Applicant: NOKIA SOLUTIONS AND NETWORKS OY, Espoo (FI)

(72) Inventors: Philippe Godin, Versailles (FR); Tsunehiko Chiba, Saitama (JP)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 544 days.

(21) Appl. No.: 17/431,154

(22) PCT Filed: Feb. 14, 2019

(86) PCT No.: PCT/EP2019/053719
§ 371 (c)(1),
(2) Date: Aug. 14, 2021

(87) PCT Pub. No.: WO2020/164722
PCT Pub. Date: Aug. 20, 2020

(65) Prior Publication Data
US 2022/0150763 A1      May 12, 2022

(51) Int. Cl.
*H04W 36/00*          (2009.01)
(52) U.S. Cl.
CPC ............... *H04W 36/00226* (2023.05); *H04W 36/00698* (2023.05)
(58) Field of Classification Search
CPC ......... H04W 36/0022; H04W 36/0069; H04W 36/0072; H04W 76/16; H04W 36/0027
See application file for complete search history.

(56) References Cited

U.S. PATENT DOCUMENTS

| | | | |
|---|---|---|---|
| 2008/0025263 A1* | 1/2008 | Pelkonen | H04W 36/0066 |
| | | | 370/332 |
| 2009/0129342 A1* | 5/2009 | Hwang | H04W 36/0022 |
| | | | 370/331 |

(Continued)

FOREIGN PATENT DOCUMENTS

| | | |
|---|---|---|
| CN | 104904267 A | 9/2015 |
| CN | 105144830 A | 12/2015 |

(Continued)

OTHER PUBLICATIONS

"3rd Generation Partnership Project; Technical Specification Group Radio Access Network; Evolved Universal Terrestrial Radio Access (E-UTRA) and NR' Multi-Connectivity; Stage 2 (Release 15)", 3GPP TS 37.340 v15.4.0, (Dec. 2018), 68 pages.

(Continued)

*Primary Examiner* — Cheikh T Ndiaye
(74) *Attorney, Agent, or Firm* — Alston & Bird LLP

(57)              ABSTRACT

Transport information of a second communication system is allocated to at least one radio access bearer between a terminal device and a first packet core serving device of a first communication system. Information about the at least one allocated tunnel endpoint is signalled to a network access device of the first communication system, and data received from the first packet core serving device of the first communication system at one of the at least one allocated tunnel endpoints and data received from a second packet core serving device of the second communication system is forwarded to the terminal device during an inter-system handover.

21 Claims, 4 Drawing Sheets

(56)                     References Cited

U.S. PATENT DOCUMENTS

| | | | |
|---|---|---|---|
| 2010/0246533 A1* | 9/2010 | Lundin | ............. H04W 36/0066 |
| | | | 370/332 |
| 2015/0341836 A1 | 11/2015 | Aminaka et al. | |
| 2015/0358866 A1 | 12/2015 | Xu et al. | |
| 2017/0265175 A1 | 9/2017 | Gandhi | |
| 2017/0280501 A1 | 9/2017 | Xu et al. | |
| 2017/0359854 A1 | 12/2017 | Chiba et al. | |

FOREIGN PATENT DOCUMENTS

| | | | | | |
|---|---|---|---|---|---|
| CN | 106162732 A | 11/2016 | | | |
| CN | 106717108 A | 5/2017 | | | |
| CN | 107113901 A | 8/2017 | | | |
| WO | WO 2016/060483 A1 | 4/2016 | | | |
| WO | WO 2018/104579 A1 | 6/2018 | | | |
| WO | WO 2018/128494 A1 | 7/2018 | | | |
| WO | WO-2018144758 A1 * | 8/2018 | ............ | H04W 36/00 |

OTHER PUBLICATIONS

CMCC, "0ms Interruption Time for Inter RAT Handover", 3GPP TSG-RAN WG2 NR AdHoc, R2-1706990, (Jun. 27-29, 2017), 2 pages.

Ericsson et al., "Intersystem Data Forwarding—Facts, History and Background on the RAN3 Working Agreement", 3GPP TSG-RAN Meeting #82, RP-182684, (Dec. 10-13, 2018), 6 pages.

International Search Report and Written Opinion for Patent Cooperation Treaty Application No. PCT/EP2019/053719 dated Apr. 12, 2019, 11 pages.

First Examination Report for Indian Application No. 202147040680 dated Apr. 22, 2022, 6 pages.

Ericsson, "Establishing a Second NG-U Tunnel for a PDU Session", 3GPP TSG-RAN WG3 #99bis Meeting, R3-182176, (Apr. 16-20, 2018), 16 pages.

Office Action for Chinese Application No. 201980095270.6 dated Nov. 1, 2023, 24 pages.

Office Action for European Application No. 19708408.0 dated Oct. 4, 2023, 6 pages.

Office Action for Chinese Application No. 201980095270.6 dated Apr. 17, 2024, 15 pages.

Decision to Grant for Chinese Application No. 201980095270.6 dated Jul. 2, 2024, 3 pages.

Hearing Notice for Indian Application No. 202147040680 dated Dec. 22, 2025, 2 pages.

Office Action for European Application No. 19708408.0 dated Dec. 16, 2025, 7 pages.

* cited by examiner

METHODS AND APPARATUS FOR OPTIMIZED INTER-SYSTEM HANDOVER

CROSS-REFERENCE TO RELATED APPLICATIONS

This application is a national phase entry of International Application No. PCT/EP2019/053719, filed Feb. 14, 2019, the entire contents of which are incorporated herein by reference.

FIELD

This disclosure relates to communications, and more particularly to methods and apparatus for inter-system handover in a wireless communication system.

BACKGROUND

A communication system can be seen as a facility that enables communication between two or more devices such as terminal devices (e.g. user terminals, machine-like terminals, user equipment (UE), mobile units or other types of end devices), base stations and/or other nodes by providing communication channels for carrying information between the communicating devices. The communication may comprise, for example, communication of data for carrying data for voice, electronic mail (email), text message, multimedia and/or content data communications and so on.

A communication system and associated devices typically operate in accordance with a given standard or specification which sets out what the various entities associated with the system are permitted to do and how that should be achieved. Since introduction of fourth generation (4G) services increasing interest has been paid to the next, or fifth generation (5G) standard. 5G may also be referred to as a New Radio (NR) network. Standardization of 5G or NR networks has been finalized in 3GPP release 15.

If during an ongoing call or data session a terminal device moves from one communication system to a different communication system or gets access to the different communication system, a handover (sometimes also called "hand-off") procedure may be initiated to avoid dropping of the call or data session. Such a handover may be called an inter-system handover. E.g., when a communication signal becomes weak in a given cell or cover range of a communication system and no other cell or cover range of the communication system can be found, such an inter-system handover may be used. Optimizations are being looked at in a direction of direct forwarding between source (target) base station and target (source) base station.

SUMMARY

There is provided according to a first aspect an apparatus comprising means for performing:
allocating transport information of a second communication system to at least one radio access bearer between a terminal device and a first packet core serving device of a first communication system;
signalling the allocated transport information to a network access device of the first communication system; and
forwarding data received from the first packet core serving device of the first communication system in accordance with the allocated transport information and data received from a second packet core serving device of the second communication system to the terminal device during an inter-system handover.

According to a second aspect, there is provided an apparatus comprising means for performing:
receiving transport information from a network access device of a second communication system;
signalling the received transport information to a packet core serving device of a first communication system for use in an inter-system handover between the first and second communication systems; and
signalling an indication about a dual-connectivity status to the network access device of the second communication system.

According to a third aspect, there is provided an apparatus comprising:
an allocation circuit for allocating transport information of a second communication system to at least one radio access bearer between a terminal device and a first packet core serving device of a first communication system;
a signalling circuit for signalling the allocated transport information to a network access device of the first communication system; and
a forwarding circuit for forwarding data received from the first packet core serving device of the first communication system in accordance with the allocated transport information and data received from a second packet core serving device of the second communication system to the terminal device during an inter-system handover.

According to a fourth aspect, there is provided an apparatus comprising:
a receiving circuit for receiving transport information from a network access device of a second communication system; and
a signalling circuit for signalling the received transport information to a packet core serving device of a first communication system for use in an inter-system handover between the first and second communication systems, and for signalling an indication about a dual-connectivity status to the network access device of the second communication system.

According to a fifth aspect, there is provided a method comprising:
allocating transport information of a second communication system to at least one radio access bearer between a terminal device and a first packet core serving device of a first communication system;
signalling the allocated transport information to a network access device of the first communication system; and
forwarding data received from the first packet core serving device of the first communication system in accordance with the allocated transport information and data received from a second packet core serving device of the second communication system to the terminal device during an inter-system handover.

According to a sixth aspect, there is provided a method comprising:
receiving transport information from a network access device of a second communication system; and
signalling the received transport information to a packet core serving device of a first communication system for use in an inter-system handover between the first and second communication systems; and
signalling an indication about a dual-connectivity status to the network access device of the second communication system.

According to a seventh aspect, there is provided a computer program product comprising instructions for causing an apparatus to perform at least the following:

allocating transport information of a second communication system to at least one radio access bearer between a terminal device and a first packet core serving device of a first communication system;

signalling the allocated transport information to a network access device of the first communication system; and forwarding data received from the first packet core serving device of the first communication system in accordance with the allocated transport information and data received from a second packet core serving device of the second communication system to the terminal device during an inter-system handover.

According to an eighth aspect, there is provided a computer program product comprising instructions for causing an apparatus to perform at least the following:

receiving transport information from a network access device of a second communication system; and signalling the received transport to a packet core serving device of a first communication system for use in an inter-system handover between the first and second communication systems; and signalling an indication about a dual-connectivity status to the network access device of the second communication system.

In a first example, the means of the apparatus of the first aspect or a determination circuit of the apparatus of the third aspect or the method of the fifth aspect or the computer program product of the seventh aspect may be configured to determine a dual-connectivity capability required for the inter-system handover procedure based on a response received from the network access device of the first communication system.

In a second example which may be combined with the first example, the means of the apparatus of the first aspect or the determination circuit of the apparatus of the third aspect or the method of the fifth aspect or the computer program product of the seventh aspect may be configured to infer the dual-connectivity capability from at least one of the transport information or a continuation flag provided in the response received from the network access device of the first communication system.

In a third example which may be combined with the first or second example, the response of the apparatus of the first or third aspect or the method of the fifth aspect or the computer program product of the seventh aspect may be an addition request message of an addition or modification procedure for adding a secondary network access device to the terminal device or may be a handover request message.

In a fourth example which may be combined with any of the first to third examples, the means of the apparatus of the first aspect or the signalling circuit of the apparatus of the third aspect or the method of the fifth aspect or the computer program product of the seventh aspect may be configured to signal the transport information in a handover request message.

In a fifth example, which may be combined with any of the first, second and fourth examples, the means of the apparatus of the first aspect or the signaling circuit of the apparatus of the third aspect or the method of the fifth aspect or the computer program product of the seventh aspect may be configured to signal the transport information in a response to an addition request message of an addition or modification procedure for adding a secondary network access device to the terminal device, the addition request message comprising information about the at least one radio access bearer between the terminal device and the first packet core serving device of the first communication system.

In a sixth example, which may be combined with any of the first to fifth examples, the means of the apparatus of the first aspect or a managing circuit of the apparatus of the third aspect or the method of the fifth aspect or the computer program product of the seventh aspect may be configured to manage a transition from old data coming from the first packet core serving device of the first communication system to new data coming from the second packet core serving device of the second communication system.

In a seventh example, which may be combined with any of the first to sixth examples, the means of the apparatus of the first aspect or a setting circuit of the apparatus of the third aspect or the method of the fifth aspect or the computer program product of the seventh aspect may be configured to set a network access device of the second communication system into a state of a secondary network access device for the terminal device, wherein the network access device of the first communication system is a master network access device of the terminal device.

In an eighth example, the means of the apparatus of the second aspect or the receiving circuit of the apparatus of the fourth aspect or the method of the sixth aspect or the computer program product of the eighth aspect may be configured to receive the transport information from the network access device of the second communication system in a handover request message, and to signal the indication about the dual-connectivity status to the network access device of the second communication system by an addition request message of an addition or modification procedure for adding the network access device of the second communication system as a secondary network access device to the terminal device.

In a ninth example, which may be combined with the eighth example, the means of the apparatus of the second aspect or the receiving circuit of the apparatus of the fourth aspect or the method of the sixth aspect or the computer program product of the eighth aspect may be configured to receive the transport information from the network access device of the second communication system in a response to an addition request message of an addition or modification procedure for adding the network access device of the second communication system as a secondary network access device to the terminal device, and to signal the indication about the dual-connectivity status to the network access device of the second communication system in a handover required message.

In a tenth example, which may be combined with any of the eighth or ninth example, the means of the apparatus of the second aspect or a signaling circuit of the apparatus of the fourth aspect or the method of the sixth aspect or the computer program product of the eighth aspect may be configured to signal the indication about the dual-connectivity status by adding at least one of the transport information or a continuation flag.

In an eleventh example, which may be combined with the ninth or tenth example, the means of the apparatus of the second aspect or a signaling circuit of the apparatus of the fourth aspect or the method of the sixth aspect or the computer program product of the eighth aspect may be configured to signal the received transport information to the packet core serving device of the first communication system in a radio access bearer modification indication message.

In a twelfth example, which may be combined with the eighth or tenth example, the means of the apparatus of the second aspect or a signaling circuit of the apparatus of the fourth aspect or the method of the sixth aspect or the computer program product of the eighth aspect may be configured to signal the received transport information to the packet core serving device of the first communication system in a handover request acknowledge message.

In a thirteenth example, the means of the apparatus of the first and second aspects and all its examples may comprise:
    at least one processor; and
    at least one memory including computer program code,
        the at least one memory and computer program code
        configured to, with the at least one processor, cause the
        performance of the apparatus.

In a fourteenth example which may be combined with any of the first to thirteenth examples, the first communication system may be an evolved packet system and the second communication system may be a 5th generation system.

In a fifteenth example which may be combined with any of the first to fourteenth examples, the transport information may comprise information about a transport address and a tunnel endpoint.

In a sixteenth example which may be combined with any of the first to fifteenth examples, the transport information may be signalled in a transparent container.

The computer program products of the seventh and eighth aspects may be stored on a medium or may be downloaded from a network.

A chipset may comprise the apparatus as described herein.

BRIEF DESCRIPTION OF THE DRAWINGS

Some example embodiments will now be described with reference to the accompanying drawings in which.

DETAILED DESCRIPTION

The following describes in further detail some examples of systems, apparatus and possible mechanisms for an inter-system handover between different wireless communication systems, such as an inter-system handover between fourth generation (4G) and fifth generation (5G) cellular networks and vice versa. It is however noted that some embodiments may also be implemented in other systems, apparatus and possible mechanisms for other types of networks with inter-system handover options between all kind of network access devices.

Figure 1:
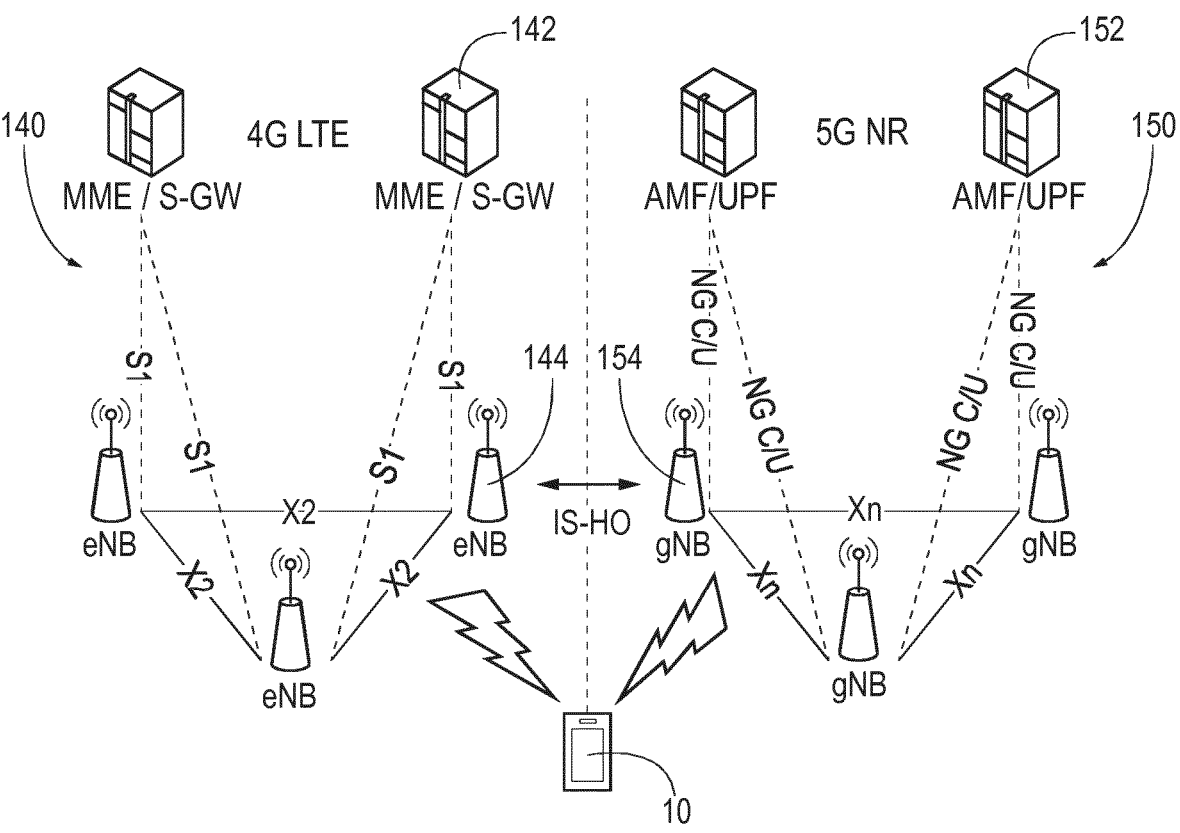
FIG. 1 shows a schematic example of a network architecture with two wireless communication systems where some example embodiments may be implemented.

FIG. 1 schematically shows a schematic example of a wireless communication system with a 4G Long Term Evolution (LTE) system 140 (left-hand portion of FIG. 1) and a parallel or overlapping 5G New Radio (NR) system 150 (right-hand portion of FIG. 1), where some example embodiments may be implemented. It is noted that the two different 4G and 5G systems 140, 150 do not have to be geographically separated by a border line (as shown in FIG.

1). They can be arranged in an overlaying or at least partially overlaying fashion in the same geographical area.

An exemplary terminal device (e.g. UE in 4G or 5G terminology) 10 may be in a cell or coverage area of at least one of a plurality of base stations 144, 154 or other types of access devices of the 4G and 5G systems 140, 150 and may by in the process of being involved in an inter-system handover (IS-HO) from the 4G system 140 to the 5G system 150, or vice versa.

More specifically, each of the base stations 144, 154 of the 4G and 5G systems 140, 150 may be an anchor point or serving base station for all mobile communications in its respective defined cell. They may be connected via respective wireless interfaces (e.g. X2 interfaces in the 4G system and Xn interfaces in the 5G system)). In the example of FIG. 1, one of the two central base stations 144, 154 currently serves the terminal device 10 located in their (overlapping) coverage areas or cells. Examples of such base stations could be a node B ("eNB" or "eNodeB" in 4G terminology, "gNB" or "gNodeB" in 5G terminology) or any other type of access device, e.g., a small cell or similar.

In the 4G system 140 of FIG. 1, three exemplary base stations (e.g. eNBs) 144 may be connected to at least one of respective exemplary serving devices 142 of a packet core functionality (e.g. Mobility Management Entities (MME) and/or Serving Gateways (SGWs) of an evolved packet core (EPC) of the 4G system) via respective interfaces (e.g. S1 interfaces).

The packet core functionality (e.g. EPC) may provide a starting point for the introduction of a packet transmission protocol (e.g. the Internet Protocol (IP)) into the circuit-switched (CS] domain of the 4G core network as well as enhancements to enable real-time and non-real-time services to be successfully integrated onto a common transport medium. Optionally, the functionality of the 4G core network may be made flatter with at least some functionality required to support service delivery being placed within other domains (e.g. the IP Multimedia Subsystem (IMS)).

As indicated in FIG. 1, the packet core functionality (e.g. EPC) may comprise at least one serving device 142 (e.g. MME and/or SGW) that may perform at least one of mobility functions such as paging, security and idle-mode procedures and may terminates a user plane within the packet core functionality.

More specifically, the serving device 142 may be responsible for mobility and session management procedures in the packet core functionality. As such, it may communicate with the terminal device 10 via an access-to-core network signalling (e.g. Non Access Stratum (NAS) signaling) and may communicates with a user database (e.g. home subscriber server (HSS)) through a specific protocol (e.g. Diameter protocol). Responsibilities of the serving device 142 may include at least one of ECM (evolved packet system (EPS) connection management), EMM (EPS mobility management), gateway selection, NAS security and handover assistance.

Furthermore, the serving device 142 may be the user data plane ingress and egress point of the radio access network (e.g. evolved universal terrestrial radio access network (E-UTRAN)) side of the EPC. As such, when the terminal device 10 moves within the radio access network, its point of attachment (i.e. serving base station 144) to the EPC remains fixed at the responsible serving device 142 (unless the network decides that a serving device relocation is required). Additional responsibilities of the serving device 142 may include lawful interception of subscriber traffic of the terminal device 10, as well as downlink data buffering whilst the subscriber of the terminal device 10 is paged.

In the 5G system 150 of FIG. 1, three exemplary base stations (e.g. gNBs) 154 may be connected to at least one of respective exemplary serving devices 152 of a packet core functionality (e.g. User Plane Function (UPF) of the 5G system) via respective interfaces (e.g. NG-C/U interfaces). Here, the packet core functionality (e.g. UPF) may support features and capabilities to facilitate user plane operations, such as packet routing and forwarding, interconnection to a data network, policy enforcement and data buffering.

A further element of the 5G system is an access and mobility management function (AMF) which handles anything that has to do with connection or mobility management while forwarding session management requirements to a session management function (SMF not shown in FIG. 1). The AMF determines which SMF is best suited to handle a connection request by querying a network repository function (NRF). The SMF sets configuration parameters in the UPF that define traffic steering parameters and ensure the appropriate routing of packets while guaranteeing the delivery of incoming packets.

It is assumed that a dual connectivity (e.g. E-UTRAN New Radio-Dual Connectivity (EN-DC)) is provided in the 4G and 5G systems 140, 150, that enables introduction of 5G services and data rates in the 4G system 140. Terminal devices that support such a dual connectivity can connect simultaneously to a master base station (e.g. Master Node eNB (MN-eNB or MeNB)) of the 4G system 140 and a secondary base station (e.g. Secondary Node gNB (SN-gNB or SgNB)) of the 5G system 150. This approach may permit cellular network providers to roll out services of a future communication system (e.g. the 5G system 150 of FIG. 1) without the expense of a full-scale core network of the future communication system. Thereby, new base stations of the future communication system (e.g. the 5G base stations 154 of FIG. 1) can be introduced early in areas of a conventional communication system (e.g. the 4G system 140 of FIG. 1) with high traffic congestion.

Assuming that the terminal device 10 in FIG. 1 is a dual-connectivity enabled terminal device, it may first register for service with one of the serving devices 142 of the packet core functionality (e.g. EPC) of the 4G system 140. The terminal device 10 may then also start reporting measurements on channel frequencies of the 5G system 150. If the signal quality for the terminal device 10 will support a service of the 5G system 150, the serving base station 144 of the 4G system 140 may communicate with a base station 154 of the 5G system to assign resources for a 5G bearer. A resource assignment of the 5G system 150 may then be signalled to the terminal device 10 e.g. via a connection reconfiguration message (e.g. Radio Resource Control (RRC) Connection Reconfiguration message). Once the initiated connection reconfiguration procedure is completed, the terminal device 10 may simultaneously connect to both 4G and 5G networks 140, 150.

According to a conventional inter-system handover between base stations of different wireless communication systems (e.g. 4G-to-5G handover as specified in release 15 of 3GPP standardization), a source base station (e.g. enhanced Node B or eNB in 4G) of the first system (e.g. 4G) first sends forwarded data over an enhanced radio access bearer (e.g. an E-UTRAN Radio Access Bearer (E-RAB)) of the first system to a serving device (e.g. serving gateway (SGW) in 4G) of the first system, which then maps the data onto bearers of the second system (e.g. Evolved Packet System (EPS bearers) in 5G) to a serving device (e.g. User Plane Function (UPF) in 5G) which then maps them onto a tunnel connection (e.g. a packet data unit (PDU session tunnel) and sends the data to a target access device (e.g. Next Generation Radio Access Network (NG-RAN) node in 5G).

Vice versa (e.g. 5G-to-4G handover as specified in release 15 of 3GPP standardization), the source base station (e.g. NG-RAN node in 5G) of the second system (e.g. 5G) first sends the forwarded data over a tunnel connection (e.g. PDU session tunnel in 5G) to the serving device (e.g. UPF in 5G) of the second system, which then maps the data onto bearers of the first system (e.g. EPS bearers in 4G) to a serving device (e.g. SGW in 4G) which then maps them onto enhanced radio access bearers (e.g. E-RABs) of the first system and sends them to a target bases station of the first system (e.g. eNB in 4G).

The enhanced radio access bearer (e.g. E-RAB) may refer to a concatenation of a packet system bearer (e.g. S1 bearer or EPS bearer) used for transmission via the interface (e.g. S1 interface) between the serving base station and the serving device of the packet core functionality and a corresponding radio access bearer. The enhanced radio access bearer (e.g. E-RAB) may thus correspond to a packet flow with a defined quality of service (QoS) between the serving device of the packet core functionality and a respective terminal device and may be adapted to route packet traffic from the serving device of the packet core functionality to the respective terminal device.

When such an enhanced radio access bearer exists, there may be a one-to-one mapping between this enhanced radio access bearer and a bearer of the packet core functionality (e.g. NAS). Each enhanced radio access bearer may be defined by at least one of a bearer identity (ID) used to identify the enhanced radio access bearer on the interface (e.g. S1 interface) between the serving base station and the serving device of the packet core functionality, and a bearer quality (e.g. QoS) element which may include a quality class identifier (QCI) that defines quality parameters such as end-to-end delay, bit error rates, allocation and retention priorities, and guaranteed bit rate parameters if real time services are to be supported over the enhanced radio access bearer.

According to some examples, inter-system handover can be optimized by introducing a direct forwarding approach to thereby reduce complexity and increase efficiency of the inter-system handover process, e.g., reducing the number of hops and interworking between enhanced radio access bearers of the 4G system and packet data unit (PDU) session tunnels of the 5G system.

According to some examples, the direct forwarding between a source node (e.g. eNB) of a radio access network of a first communication system (e.g. 4G) and a target node (e.g. gNB) of a radio access network of a second communication system (e.g. 5G) may be enabled by setting up a transport link (such as a tunnel connection (e.g. a GTP tunnel)) per enhanced radio access bearer (e.g. E-RAB). Over such a transport link all data belonging to the QoS flows associated to that enhanced radio access bearer can be forwarded.

According to some examples, the forwarding (source) base station of the first communication system (e.g. the 4G system of FIG. 1) may act as a master base station of a dual-connectivity terminal device and may add the target base station of the second communication system (e.g. the 5G system of FIG. 1) as a secondary base station in a first phase during which the master base station offloads at least some or all of its enhanced radio bearers to the secondary base station using an addition or modification procedure of the secondary base station (e.g. X2 SgNB Addition or Modification procedure). In an example, as part of this process, the secondary base station may allocate transport information (e.g. a transport address and a tunnel endpoint identifier (TEID) of a tunneling protocol such as the GTP protocol) for the received enhanced radio access bearers, to which the serving device of the master base station of the first communication system can send the data to be forwarded, and informs the master base station about these tunnel endpoints.

According to some examples, the allocated transport information may generally comprise a combination of a transport address according to a transport protocol and a tunnel endpoint according to a tunnel protocol, so that both transport address (e.g. IP address or the like) and tunnel endpoint (e.g. GTP tunnel endpoint) can be allocated for sending data to a target node of the other communication system for the inter-system handover.

Then, according to some examples, in a second phase, the master base station of the first communication system may trigger e.g. during a handover preparation phase, e.g. via the core networks of both communication systems, an inter-system handover indicating to the target base station (i.e. secondary base station) of the second communication system the received transport information and/or a continuation flag which indicates a dual-connectivity status, capability or situation for the inter-system handover. The target base station may infer from this that it can perform internal processing, buffering and forwarding and does not need to return forwarding addresses to the source base station (i.e. master base station).

Later on, according to some examples, the target base station may manage itself the transition from old data coming from the packet core serving device of the first communication system to new data coming from the packet core serving device of the second communication system, e.g., with an internal smart implementation.

According to some examples, the target base station (which knows the mapping of packet data sessions/flows to enhanced radio access bearers) may include one address (determined based on the allocated transport information (e.g. transport address and tunnel endpoint) per enhanced radio access bearer that the source base station proposed for forwarding if it accepts this forwarding. The core network may relay these radio access bearer addresses to the source base station. The source base station may deliver the forwarded data to the radio access bearer tunnels corresponding to these radio access bearer addresses received from target base station. The target base station may be organized to manage incoming forwarded data from the enhanced radio access bearers.

It is noted that, with the above inter-system handover procedure, no data forwarding needs to take place externally, i.e., between forwarding (source) base station of the first communication system and the receiving (target) base station of the second communication system during the inter-system handover.

According to some examples, the forwarding (source) base station of the second communication system (e.g. the 5G system of FIG. 1) may indicate, during an inter-system handover preparation phase, e.g. via the core networks of both communication systems, transport information (e.g. transport address and tunnel endpoint (TEID)) for enhanced radio access bearers, that the source base station is ready to use as secondary base station for a dual-connectivity terminal device. In an example, the target base station of the first communication system (e.g. the 4G system of FIG. 1) may then infer from this transport information that the source base station can perform internal processing, buffering and forwarding and therefore the target base station does not need to return forwarding addresses to the source base station.

According to some examples, as part of the inter-system handover process the target base station acting as master base station may trigger an addition procedure (e.g. X2 SgNB Addition procedure) to the source base station in order to inform about offloading at least some or all enhanced radio access bearers (e.g. E-RABs) to the source base station acting as secondary base station.

According to some examples, during this addition procedure, the target base station (as master base station) may forward the transport information that the source base station had sent during the handover preparation phase and/or a continuation flag which indicates a dual-connectivity status, capability or situation for the inter-system handover. The source base station (as secondary base station) may infer from this that it can manage internal forwarding.

According to some examples, the source base station may inform the core network that direct forwarding is possible. In this case, the forwarding radio access bearer addresses proposed by the target base station may be directly sent to the source base station. The source base station may then organize the data to be forwarded over radio access bearer tunnels or other direct links targeted at the received target base station addresses.

Again, it is noted that, with the above inter-system handover procedure, no data forwarding needs to take place externally, i.e., between forwarding (source) base station of the second communication system and the receiving (target) base station of the first communication system during the inter-system handover.

In the following, a more detailed description of some examples of an inter-system handover is given for the exemplary case of a handover between 4G and 5G systems.

Figure 2:
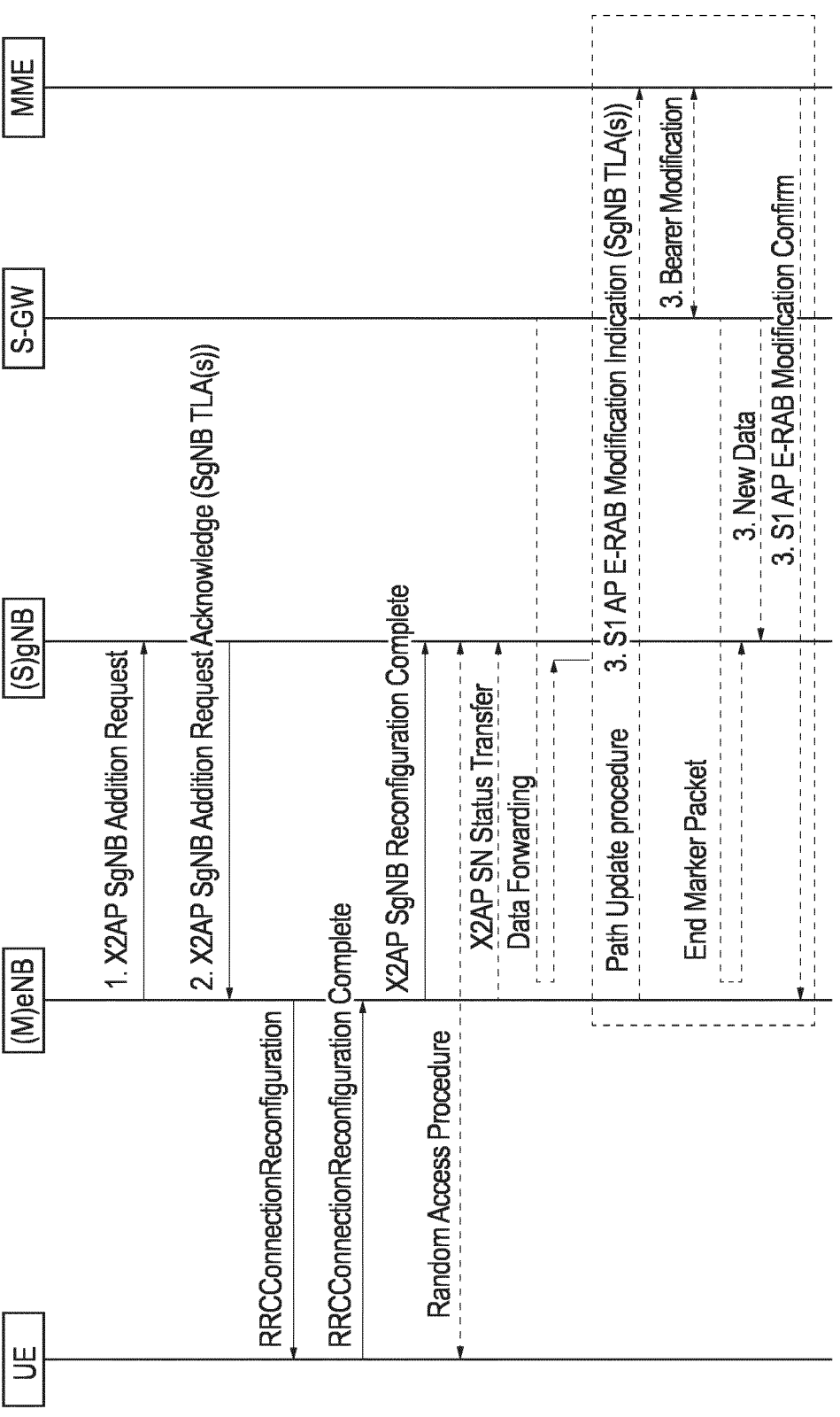
FIG. 2 shows a message sequence chart for a master-initiated addition/modification procedure for adding a secondary network access device.
Figure 3:
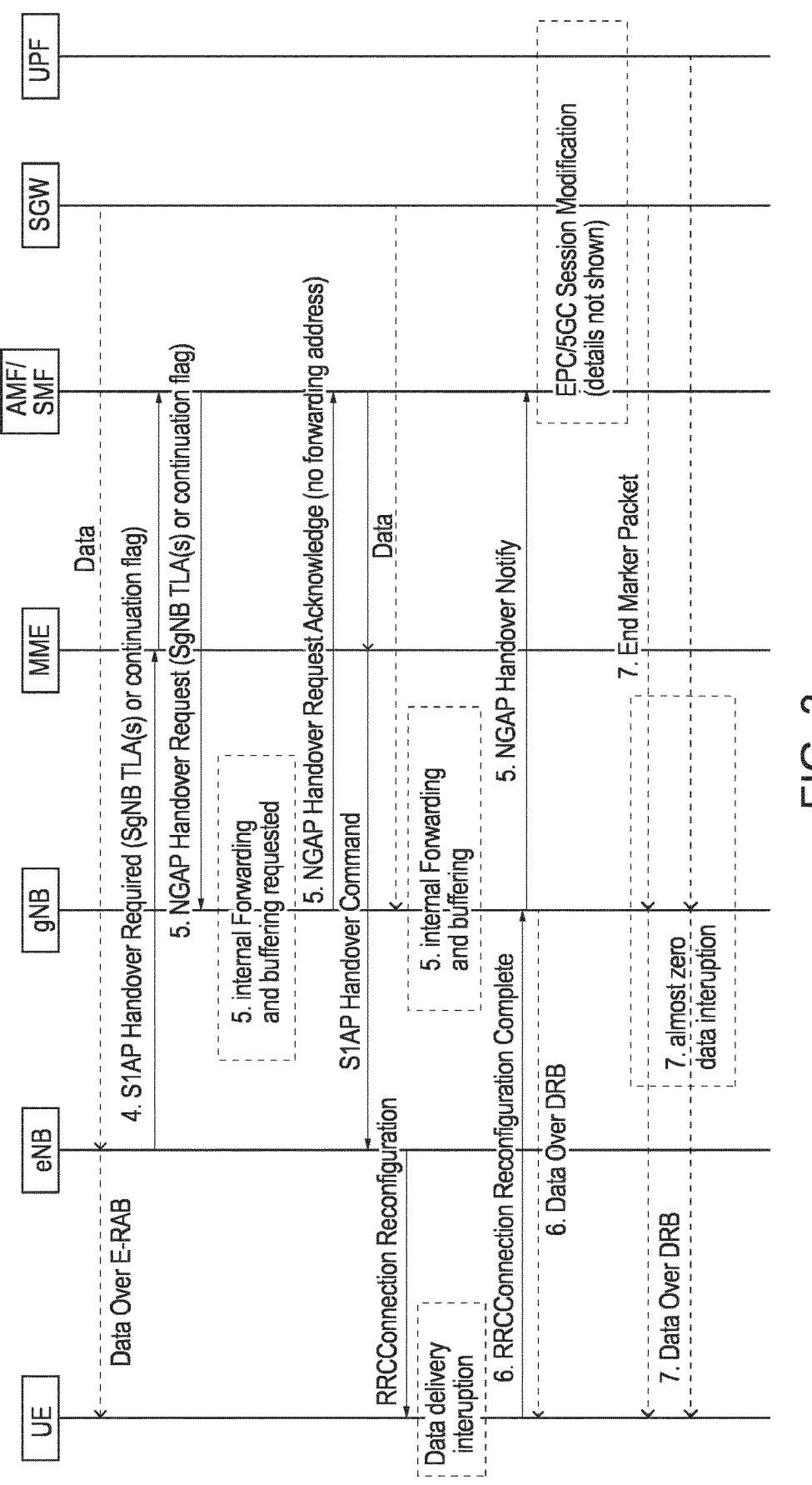
FIG. 3 shows a message sequence chart for inter-system handover according to a sample embodiment.

According to some examples, in a 4G to 5G handover case, data bearers may be handed over in two phases: phase 1 (steps 1 to 3) is shown in FIG. 2 and phase 2 (steps 4 to 7) is shown in FIG. 3.

FIG. 2 shows a message sequence chart for a master-initiated addition/modification procedure for adding a secondary access device, as phase 1 of a 4G to 5G handover.

Phase 1 is an addition or modification procedure initiated by a master eNB (MeNB) for adding a secondary gNB (SgNB).

It is noted that in the description below, a transport layer address (TLA) denotes a transport address plus a TEID (e.g. a GTP tunnel endpoint) and thus corresponds to an example of the above mentioned transport information.

The eNB of the 4G system may act as MeNB and may add the gNB of the 5G system as SgNB in step 1 during which the MeNB may offload some or all of its enhanced radio bearers (E-RABs) to the SgNB by sending an X2 SgNB Addition or Modification request message.

Then, in step 2, the SgNB may allocate E-RAB TLA(s) to which the SGW of the 4G system can send the data and may include them and/or a continuation flag in reply in an X2 SgNB Addition Response or Modification Response message.

Finally, in step 3, e.g. after a connection reconfiguration at the terminal device (UE) and a random access procedure, the MeNB may complete the addition/modification procedure towards the EPC of the 4G system by sending an E-RAB Modification Indication message to the EPC including the SgNB E-RAB TLA(s), so that a bearer modification can be performed between the SGW and the MME and the data may now flow towards those SgNB TLA(s).

After the above phase 1, the inter-system 4G to 5G handover may take place through steps 4 to 7 shown in FIG. 3

FIG. 3 shows a message sequence chart for the inter-system 4G to 5G handover according to a sample embodiment, wherein time proceeds from the top to the bottom of the chart.

Initially, before the handover, data is forwarded from the SGW via the source eNB (i.e. MeNB) of the 4G system to the terminal device (UE).

In step 4, the MeNB may trigger a 4G to 5G handover indicating during the handover preparation phase to the target gNB the SgNB TLA(s) and/or the continuation flag (received at step 2 of FIG. 2) within a source NG-RAN to target NG-RAN transparent container within a Handover Required message.

Then, in step 5, the target gNB may infer from receiving its own SgNB TLA(s) and/or the continuation flag in the Handover Request message that it can perform an internal processing, buffering and forwarding and therefore it does not need to return forwarding TLA(s) to the source (M)eNB in a Handover Request Acknowledge message.

In the subsequent step 6, after a connection reconfiguration and data delivery interruption at the UE, when the UE arrives at the target gNB, the target gNB may readily deliver the data it has buffered but not yet transferred and which has arrived from the SGW, without any external forwarding taking place.

Finally, in step 7, after a session modification procedure at the core networks, when an end marker of the data flow arrives from the SGW, the target gNB may immediately start delivering fresh new data that has come from the UPF and has been buffered. As a result, this is a fast transition because the end marker does not need to be carried over an external interface.

According to some examples, the SgNB TLA(s) and/or the continuation flag may be added with the source NG-RAN to target NG-RAN transparent container exchanged by the S1AP Handover Required and NGAP Handover Request messages from the eNB to the gNB, which TLA(s) have been earlier received from an MeNB initiated SgNB addition or modification procedure triggered by the eNB towards the same gNB.

Figure 4:
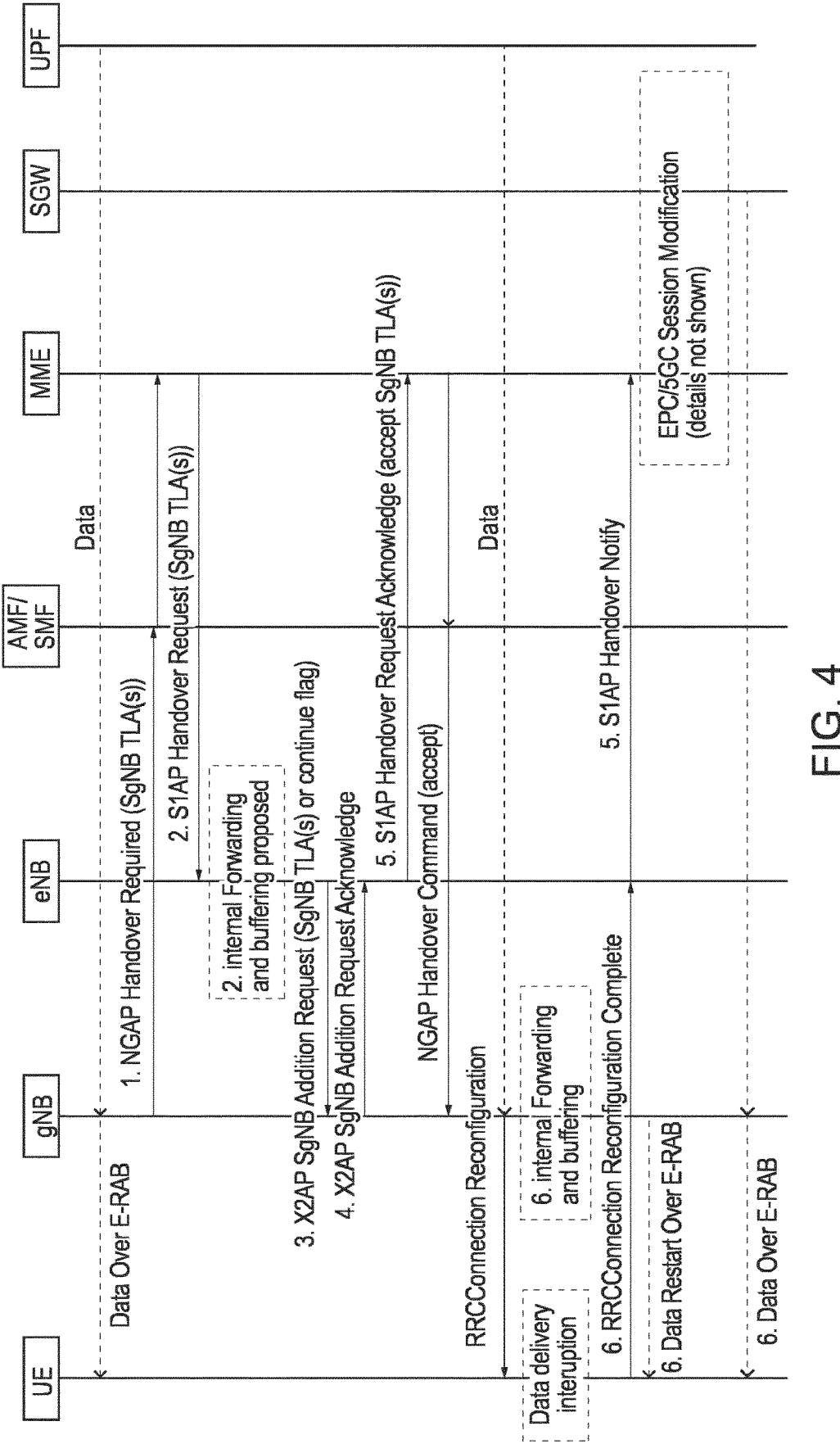
FIG. 4 shows a message sequence chart for inter-system handover according to another sample embodiment.

FIG. 4 shows a message sequence chart for an inter-system 5G to 4G handover according to another sample embodiment, wherein time proceeds from the top to the bottom of the chart.

Similarly, in the opposite handover direction 5G to 4G, the same optimization can be achieved. Again, it is noted that in the description below, the TLA denotes a transport address plus a TEID (e.g. a GTP tunnel endpoint).

Initially, before the handover, data is forwarded to the UE from the UPF via the source gNB.

In a step 1, the source gNB of the 5G system may trigger a handover preparation phase by sending a handover request message, e.g. an S1AP Handover Request message, to a target eNB of the first communication system. The handover request message may include, e.g. in a source-to-target container, TLA(s) that the source gNB is ready to use as SgNB.

Then, in step 2, the target eNB may receive the E-RAB TLA(s) in the source to target container (within a S1AP Handover Request) and may infer from this that the source gNB can perform internal processing, buffering and forwarding and therefore the target eNB does not need to return forwarding TLA(s) to the source gNB in a Handover Request Acknowledge message.

In the next step S3, the target eNB may trigger an X2 SgNB Addition procedure towards the source gNB and may include the above received E-RAB TLA(s) in the X2 Addition Request message and/or a continuation flag.

Subsequently, in step S4, upon receiving its own E-RAB TLA(s) the source gNB may infer that it can do internal forwarding and data processing.

Additionally, in step S5, the target eNB may indicate in a Handover Request Acknowledge message to the EPC the (S)gNB E-RAB TLA(s) as target addresses for the SGW to send the fresh data.

Then, in step S6, after a connection reconfiguration and data delivery interruption at the UE, the source gNB may manage internally the data coming from the UPF and SGW with internal E-RAB mapping and internal forwarding to its own E-RABs, while a corresponding session modification is performed at the core networks.

According to some examples, the SgNB TLA(s) may be added to the source eNB to target eNB transparent container exchanged from gNB to eNB over the NGAP Handover Required and S1AP Handover Request messages. The eNB may use these received TLA(s) for triggering a MeNB X2AP SgNB Addition (Modification) procedure including the above received TLA(s) and/or a continuation flag, and may include these TLA(s) also in the Handover Request Acknowledge message towards the EPC and may include in the target to source container these TLA(s) and/or a continuation flag.

Thus, according to some embodiments, inter-system handover can be improved by avoiding user data forwarding of external "already available user data". This can be achieved by allowing base stations to operate in cells or coverage areas of both communication systems involved in an inter-system handover of a terminal device and providing a signalling towards the core network required to setup radio access bearers and tunnels for "new, future or further" user data. Such signalling may involve (specific) messages that include (extra) tunnel endpoints identifiers or a continuation flag.

According to some examples, a new information element (IE), such as "extra tunnel endpoint identifier" and/or "continuation flag" may be added to involved user plane setup messages indicated above.

According to some examples, the proposed inter-system handover procedure according to some embodiments enables to suppress external forwarding during inter-system handover in cases where the source (respectively target) base station supports a dual-connectivity function with the target (respectively source) base station.

According to some examples, delay for data forwarding may be reduced and there may be less load on terrestrial interfaces.

According to some examples, loss of data packets may be avoided, as all packets can be managed in same access node.

In general, the various example embodiments and examples may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device. Some of the examples may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out some of the examples. The one or more computer-executable components may be at least one software code or portions of it.

Further in this regard it should be noted that any blocks or functions of the logic flow as shown in FIGS. 2 and 3 may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general-purpose computers, special purpose computers, microprocessors, digital signal processors (DSPs), application specific integrated circuits (ASIC), FPGA, gate level circuits and processors based on multi core processor architecture, as non-limiting examples.

Some of the examples may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of exemplary embodiments. However, various modifications and adaptations may become apparent to those skilled in the relevant arts in view of the foregoing description, when read in conjunction with the accompanying drawings and the appended claims. However, all such and similar modifications of the teachings of the described exemplary embodiments will still fall within the scope of this disclosure as defined in the appended claims. Indeed, there is a further exemplary embodiment comprising a combination of one or more exemplary embodiments with any of the other exemplary embodiments previously discussed.

The invention claimed is:

1. An target base station of a communication system, the target base station comprising:

at least one processor; and at least one memory including computer program code, the at least one memory and computer program code configured to, with the at least one processor, cause the target base station to perform:

allocating transport information of the communication system to at least one radio access bearer between a terminal device and a first packet core serving device of a source communication system;

signalling the allocated transport information to a network access device of the source communication system;

forwarding (a) first data received from the first packet core serving device of the source communication system in accordance with the allocated transport information and (b) second data received from a second packet core serving device of the communication system to the terminal device during an inter-system handover; and determining a dual-connectivity capability required for the inter-system handover based on a response received from the network access device of the source communication system.

2. The target base station of claim 1, wherein the at least one memory and computer program code are further configured to with the at least one processor, cause the target base station to infer the dual-connectivity capability from at least one of the transport information or a continuation flag provided in the response received from the network access device of the source communication system.

3. The target base station of claim 1, wherein the response is an addition request message of an addition or modification procedure for adding a secondary network access device to the terminal device.

4. The target base station of claim 1, wherein the response is a handover request message.

5. The target base station of claim 1 where the at least one memory and computer program code are configured to, with the at least one processor, cause the target base station to signal the transport information in a handover request message.

6. The target base station of claim 1 where the at least one memory and computer program code are configured to, with the at least one processor, cause the target base station to signal the transport information in a response to an addition request message of an addition or modification procedure for adding a secondary network access device to the terminal device, the addition request message comprising information about the at least one radio access bearer between the terminal device and the first packet core serving device of the source communication system.

7. The target base station of claim 1 where the at least one memory and computer program code are further configured to, with the at least one processor, cause the target base station to manage a transition from old data coming from the first packet core serving device of the source communication system to new data coming from the second packet core serving device of the communication system.

8. The target base station of claim 1 where the at least one memory and computer program code are further configured to, with the at least one processor, cause the target base station to set a network access device of the communication system into a state of a secondary network access device for the terminal device, wherein the network access device of the source communication system is a master network access device of the terminal device.

9. An apparatus comprising:
at least one processor; and
at least one memory including computer program code, the at least one memory and computer program code configured to, with the at least one processor, cause the apparatus to perform:
receiving transport information from a network access device of a communication system of a target base station;
signalling the received transport information to a packet core serving device of a source communication system for use in an inter-system handover from the source communication system to the communication system of the target base station; and
signalling an indication about a dual-connectivity status towards the network access device of the communication system of the target base station.

10. The target base station according to claim 1, wherein the first data is forwarded without forwarding the first data between a source base station and the target base station.

11. The apparatus of claim 9 where the at least one memory and computer program code are configured to, with the at least one processor, cause the apparatus to receive the transport information from the network access device of the communication system of the target base station in a handover request message, and to signal the indication about the dual-connectivity status to the network access device of the communication system of the target base station by an addition request message of an addition or modification procedure for adding the network access device of the communication system as a secondary network access device to a terminal device.

12. The apparatus of claim 9 where the at least one memory and computer program code are configured to, with the at least one processor, cause the apparatus to receive the transport information from the network access device of the communication system of the target base station in a response to an addition request message of an addition or modification procedure for adding the network access device of the communication system of the target base station as a secondary network access device to a terminal device, and to signal the indication about the dual-connectivity status to the network access device of the communication system of the target base station in a handover required message.

13. The apparatus of claim 11 where the at least one memory and computer program code are configured to, with the at least one processor, cause the apparatus to signal the indication about the dual-connectivity status by adding at least one of the transport information or a continuation flag.

14. The apparatus of claim 9 where the at least one memory and computer program code are configured to, with the at least one processor, cause the apparatus to signal the received transport information to the packet core serving device of the source communication system in a radio access bearer modification indication message.

15. The apparatus of claim 9 where the at least one memory and computer program code are configured to, with the at least one processor, cause the apparatus to signal the received transport information to the packet core serving device of the source communication system in a handover request acknowledge message.

16. The apparatus of claim 9 where the source communication system is an evolved packet system and the communication system of the target base station is a 5th generation system.

17. The apparatus of claim 9 where the transport information comprises information about a transport address and a tunnel endpoint.

18. The apparatus of claim 9 where the transport information is signalled in a transparent container.

19. A method comprising:
allocating transport information of a communication system of a target base station to at least one radio access bearer between a terminal device and a first packet core serving device of a source communication system;
signalling the allocated transport information to a network access device of the source communication system;
forwarding (a) first data received from the first packet core serving device of the source communication system in accordance with the allocated transport information and (b) second data received from a second packet core serving device of the communication system of a target base station to the terminal device during an inter-system handover; and
determining a dual-connectivity capability required for the inter-system handover based on a response received from the network access device of the source communication system.

20. A method comprising:
receiving transport information from a network access device of a communication system of a target base station;
signalling the received transport information to a packet core serving device of a source communication system for use in an inter-system handover from the source communication system to the communication system of the target base station; and
signaling an indication about a dual-connectivity status towards the network access device of the communication system of the target base station.

21. The method according to claim 19, wherein the first data is forwarded without forwarding the first data between a source base station and a target base station.

* * * * *